(12) United States Patent
Prihed et al.

(10) Patent No.: US 8,793,295 B2
(45) Date of Patent: Jul. 29, 2014

(54) METHOD FOR FAST CALCULATION OF THE BEGINNING OF PSEUDO RANDOM SEQUENCES FOR LONG TERM EVOLUTION

(75) Inventors: Assaf Prihed, Ness Zionna (IL); Ido Gazit, Haifa (IL); Shai Kalfon, Hod Hasharon (IL); Sharon Rosenschein, Yavne (IL)

(73) Assignee: LSI Corporation, San Jose, CA (US)

( * ) Notice: Subject to any disclaimer, the term of this patent is extended or adjusted under 35 U.S.C. 154(b) by 487 days.

(21) Appl. No.: 13/184,646

(22) Filed: Jul. 18, 2011

(65) Prior Publication Data
US 2013/0024489 A1      Jan. 24, 2013

(51) Int. Cl.
*G06F 7/58* (2006.01)
(52) U.S. Cl.
USPC ........................................................ 708/250
(58) Field of Classification Search
None
See application file for complete search history.

(56) References Cited

U.S. PATENT DOCUMENTS

| | | | |
|---|---|---|---|
| 7,729,237 B2 | 6/2010 | Lee et al. | 370/208 |
| 7,903,818 B2 | 3/2011 | Park et al. | 380/270 |
| 7,940,643 B2 | 5/2011 | Lee et al. | 370/208 |
| 8,559,480 B2 * | 10/2013 | Yoon et al. | 375/130 |
| 2005/0129247 A1 * | 6/2005 | Gammel et al. | 380/286 |
| 2008/0304667 A1 * | 12/2008 | Mihaljevic et al. | 380/268 |
| 2009/0136034 A1 * | 5/2009 | Gaal et al. | 380/268 |
| 2009/0257523 A1 | 10/2009 | Varadarajan et al. | 375/295 |
| 2010/0062783 A1 | 3/2010 | Luo et al. | 455/450 |
| 2010/0272040 A1 | 10/2010 | Nam et al. | 370/329 |
| 2011/0026645 A1 | 2/2011 | Luo et al. | 375/340 |
| 2011/0092231 A1 | 4/2011 | Yoo et al. | 455/501 |
| 2013/0003979 A1 * | 1/2013 | Jeong et al. | 380/287 |
| 2013/0024489 A1 * | 1/2013 | Prihed et al. | 708/235 |

* cited by examiner

*Primary Examiner* — David H Malzahn
(74) *Attorney, Agent, or Firm* — Christopher P. Maiorana, PC

(57) ABSTRACT

An apparatus including a first circuit and a second circuit. The first circuit may be configured to generate pseudo-random sequences in response to a first m-sequence and a second m-sequence, where the first m-sequence is initialized with a pre-calculated constant and the second m-sequence is initialized based on a pre-defined initial sequence and a table of pre-calculated values indicating which components of the initial sequence participate in initializing the second m-sequence. The second circuit may be configured to store the table of pre-calculated values.

20 Claims, 5 Drawing Sheets

METHOD FOR FAST CALCULATION OF THE BEGINNING OF PSEUDO RANDOM SEQUENCES FOR LONG TERM EVOLUTION

FIELD OF THE INVENTION

The present invention relates to communication generally and, more particularly, to a method and/or apparatus for implementing a fast calculation of the beginning of pseudo random sequences for LTE.

BACKGROUND OF THE INVENTION

In a cellular system implementing a third generation mobile network technology compliant with the 3rd Generation Partnership Project (3GPP) Long Term Evolution (LTE) standard (document 3GPP TS 36.211 V9.1.0 (2010-03)), pseudo-random sequences are defined by a length-31 Gold sequence (section 7.2 of document 3GPP TS 36.211 V9.1.0 (2010-03)). The output sequence c(n) of length $M_{PN}$, where n=0, 1, . . . , $M_{PN}$−1, is defined by the following equations:

$$c(n)=(x1(n+N_C)+x2(n+N_C)) \bmod 2 \quad \text{Eq. 1}$$

$$x1(n+31)=(x1(n+3)+x1(n)) \bmod 2, \quad \text{Eq. 2}$$

$$x2(n+31)=(x2(n+3)+(x2(n+2)+x2(n+1)+x2(n)) \bmod 2. \quad \text{EQ. 3}$$

The term $N_C$ represents a constant having a value of 1600. The terms $x1(n+N_C)$ and $x2(n+N_C)$ are referred to as a first m-sequence and a second m-sequence, respectively. The first m-sequence is initialized with x1(0)=1, x1(n)=0, n=1, 2, . . . , 30. The initialization of the second m-sequence is denoted by the following equation:

$$c_{init} = \sum_{i=0}^{30} x2(i) \cdot 2^i. \quad \text{EQ. 4}$$

The initialization value of the second m-sequence depends on the application of the pseudo-random sequence.

When samples c(0), c(1), . . . , c(31) are available, the sequence can be calculated easily. However, the samples c(0), c(1), . . . , c(31) have to be calculated based on the initialization sequence of x2 and x1. While the initialization sequence of x1 is constant and, therefore, can be pre-calculated, the sequence for x2(1600), . . . , x2(1630) should be calculated for each different application of the pseudo-random sequence. In a conventional system, the samples x2(1600), . . . , x2(1630) are calculated directly by iteratively calculating x2(0) through x2(1600) using Equation 4 above. The main disadvantage of the conventional method is that calculating 1600 samples utilizes real-time resources of the system and can create real-time problems.

It would be desirable to have a method and/or apparatus for implementing a fast calculation of the beginning of pseudo random sequences for LTE.

SUMMARY OF THE INVENTION

The present invention concerns an apparatus including a first circuit and a second circuit. The first circuit may be configured to generate pseudo-random sequences in response to a first m-sequence and a second m-sequence, where the first m-sequence is initialized with a pre-calculated constant and the second m-sequence is initialized based on a pre-defined initial sequence and a table of pre-calculated values indicating which components of the initial sequence participate in initializing the second m-sequence. The second circuit may be configured to store the table of pre-calculated values.

The objects, features and advantages of the present invention include providing a method and/or apparatus for fast calculation of the beginning of pseudo random sequences for LTE that may (i) reduce the complexity of calculating the first samples of the m-sequence x2, (ii) be implemented in software, (iii) be implemented in hardware, and/or (iv) improve the total real-time performance of a LTE system.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
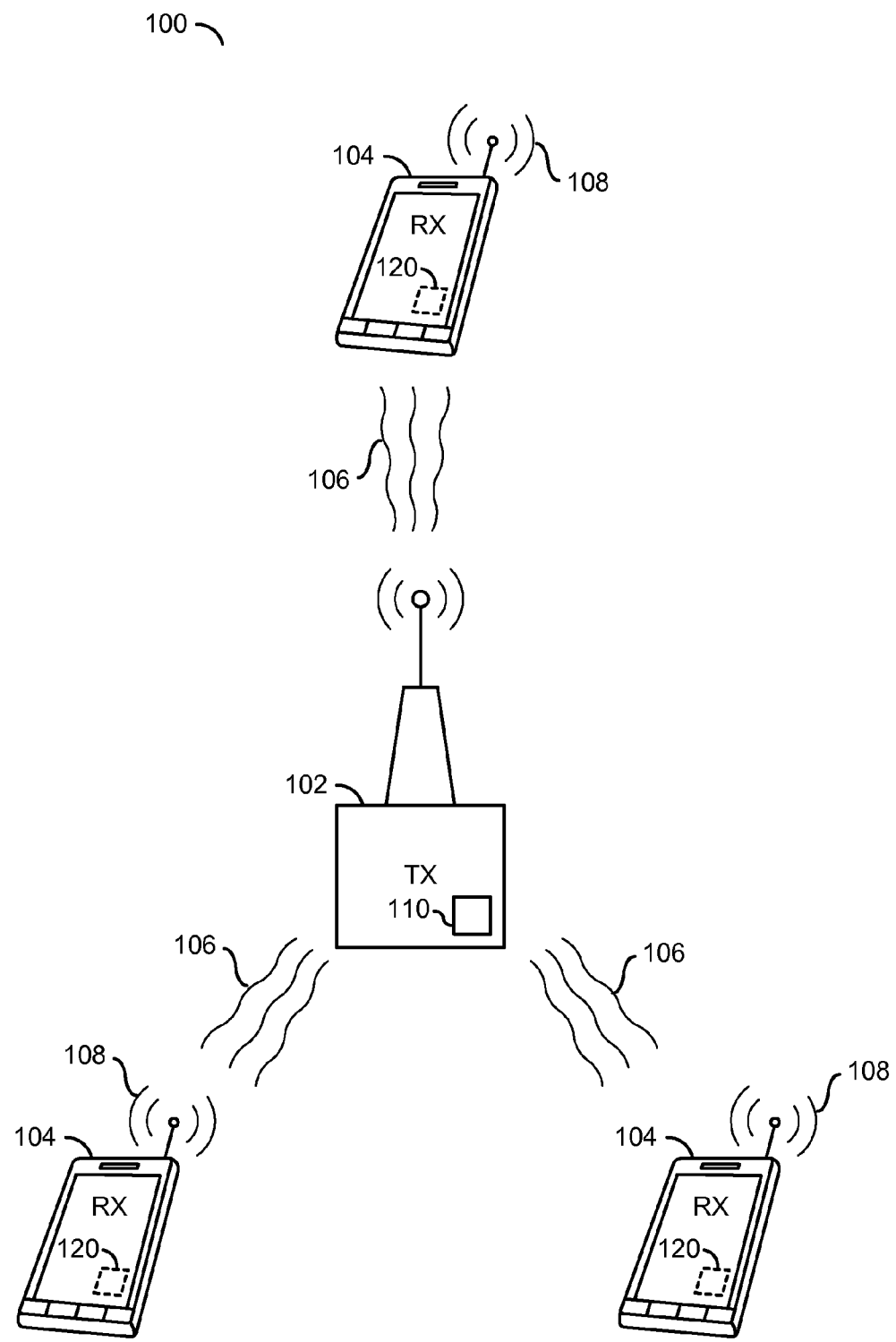
FIG. 1 is a diagram illustrating a system in which an embodiment of the present invention may be implemented.

Referring to FIG. 1, a diagram of a system 100 is shown illustrating a communications system implemented in accordance with an example embodiment of the present invention. The system 100 may implement a wireless communications system (e.g., evolved universal terrestrial radio access or E-UTRA). In one example, the system 100 may implement a third generation cellular communication system compliant with the 3rd Generation Partnership Project (3GPP) Long Term Evolution (LTE) standard (3GPP TS 36.211 V9.1.0 (2010-03). The system 100 generally comprises at least one base station 102 and a number of mobile units 104. The base station(s) 102 may transmit signals to the mobile units 104 via a downlink channel 106. Each of the mobile units 104 may transmit signals to the base station(s) 102 via an uplink channel 108. Each base station 102 may include a processing unit 110. Each mobile unit 104 may include a processing unit 120. The processing units 110 and 120 may be configured to manage communications between the base station(s) 102 and the mobile units 104.

The processing units 110 and 120 may include a lookup memory embodying a table of values that may be used in pseudo-random sequence calculations performed by either hardware incorporated in, or software executed on the processing units 110 and 120. The values in the table of values may be pre-calculated. The values are not generally changed during run time. In one example, the table of values may be stored in a read only memory (ROM). However, any type of memory or lookup table (LUT) may be implemented accordingly to store the table of values. For example, the table of values may be written to a Flash memory or other nonvolatile memory (e.g., programmable read only memory (PROM), erasable programmable read only memory (EPROM), electrically erasable programmable read only memory (EEPROM), bubble memory, etc.). Additionally, even volatile memory, such as dynamic random access memory (DRAM) or static random access memory (SRAM), may be used. For example, the table values may be calculated at power-up or transmitted to the apparatus at, for example, initiation or establishment of the uplink/downlink. In another example, a simple transformation of the table values may be stored in ROM that may be used to obtain the values. The values may be converted and then stored in RAM and accessed there.

Figure 2:
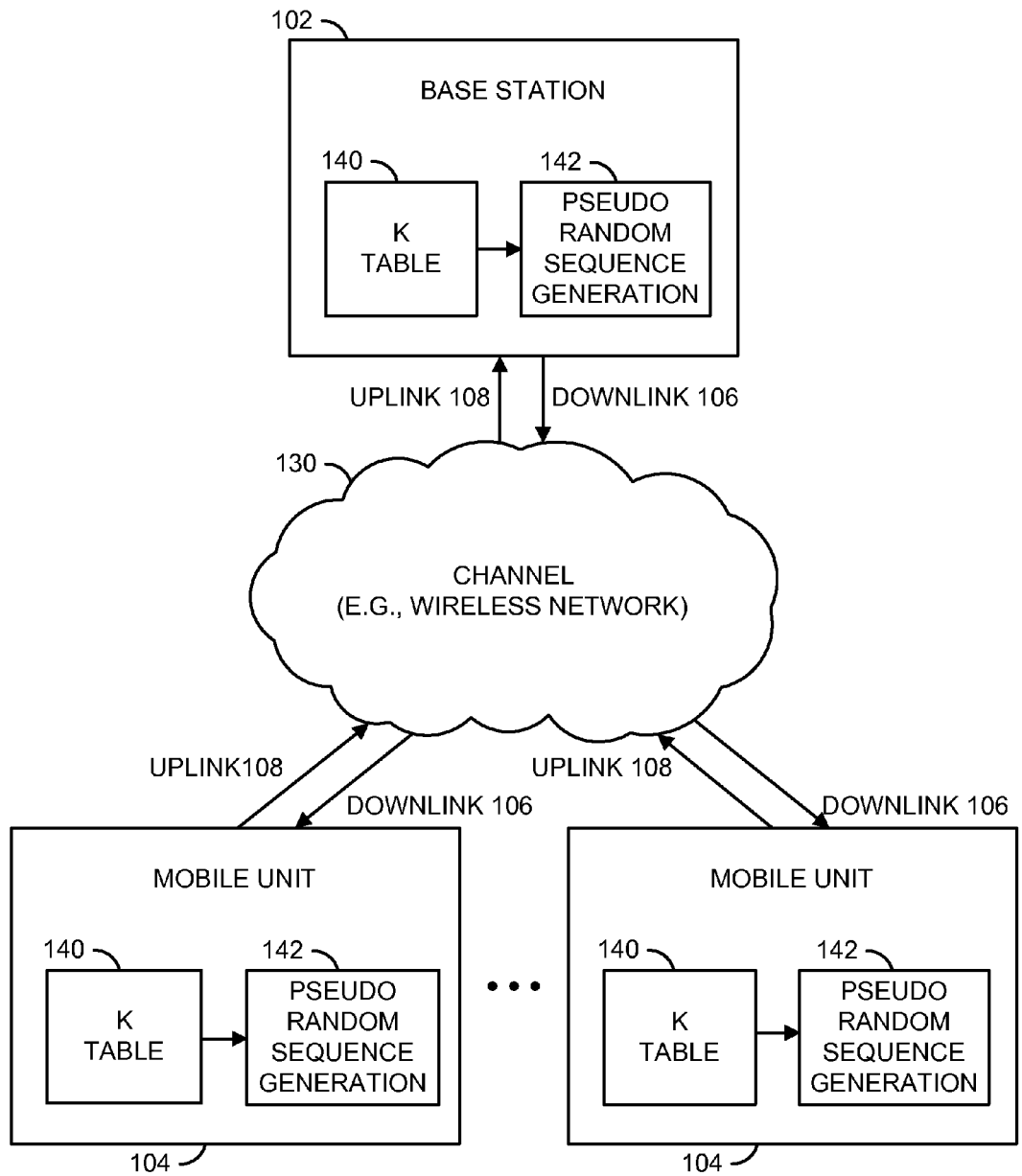
FIG. 2 is a diagram illustrating example components that may be employed in processing downlink and uplink channels in accordance with an embodiment of the present invention.

Referring to FIG. 2, a diagram is shown illustrating example components that may be employed in processing a downlink or uplink signal of the system 100. In general, the base station(s) 102 may generate pseudo-random sequences that may be utilized in downlink channel processing. The mobile units 104 may generate pseudo-random sequences that may be utilized in uplink channel processing. The base station(s) 102 and the mobile units 104 are generally coupled by a channel of a network 130. The network 130 may be implemented, for example, as a wireless network. In one example, the network 130 may implement a cellular communications network (e.g., a 3GPP LTE network, etc.). In one example, the base station(s) 102 and the mobile units 104 may include a storage device 140 and a pseudo-random sequence generator 142. The storage device 140 may be implemented using a computer readable storage medium (e.g., memory, LUT, etc.). The pseudo-random sequence generator 142 may be implemented in hardware or software. The storage device 140 is generally configured to store pre-calculated values (e.g., K values) that may be used by the pseudo-random sequence generator 142 along with an initialization sequence to generate the beginning of pseudo-random sequences.

Pseudo-random sequences may be utilized in a variety of processes performed in the system 100 (described below in connection with FIG. 4). One example of how a pseudo-random sequence may be utilized by the system 100 is the generation of a downlink reference signal. The downlink reference signal may be generated as a product of an orthogonal sequence and a pseudo-random numerical (PRN) sequence. A specific reference signal may be assigned to each cell within the network 130. The specific reference signal may, for example, act as a cell-specific identifier. Upon reception of the downlink reference signal, the mobile units 104 may perform a channel estimation operation to determine the CIR of the downlink channel. The downlink reference signal transmitted from the base station(s) 102 to the mobile units 104 is generally influenced by the transmission medium (e.g., air, etc.) through which the signal passes. For example, the signal may include some echo or multi-path interference. The echo or multi-path interference may be weak, or strong, or earlier or later in time. In one example, each mobile unit 104 may be configured to adjust a frequency domain equalizer based upon a result of the channel estimation process. An uplink reference signal may be implemented similarly between the mobile units 104 and the base station(s) 102. For example, the mobile units 104 may utilize a pseudo-random sequence to generate an uplink reference signal that may be transmitted to the base station(s) 102. The base station(s) 102 may examine the uplink reference signal to determine channel characteristics and adjust an equalizer accordingly.

In order to determine the pseudo-random sequences, a low complexity method for calculating the first samples of the pseudo-random sequence in accordance with an embodiment of the present invention may be implemented by either software (SW) or hardware (HW). The method in accordance with an embodiment of the present invention for calculating the first samples of the pseudo-random sequence may be implemented to generate the pseudo-random sequences for LTE. The method in accordance with an embodiment of the present invention may be used in place of the conventional brute force technique at each location in the LTE specification document 3GPP TS 36.211 where Section 7.2 is referenced.

It can be shown that each sample n of the second m-sequence x2 may be calculated using the following Equation 5:

$$x2(n) = \left(\sum_{i=0}^{30} k2(i,n)x2(i)\right) \mod 2, \quad \text{EQ. 5}$$

where k2(i,n) is either 0 or 1. The value k2(i,n) is not a function of the initialization sequence x2(0 to 30). In one example, the samples of x2(n) for n=1600 to 1630 may be calculated by using the following steps:
  a. pre-calculating (e.g., not on run time) the values of k2(i,n), i=0 to 30 and n=1600 to 1630, and storing the values in a table; and
  b. for each n=1600 to 1630, calculating x2(n) using the Equation 5 above.

An example implementation of the above method is described in connection with FIG. 5 below. The method generally reduces the complexity of calculating the first samples of the second m-sequence x2, and generally improves the total real-time performance of the system.

Figure 3:
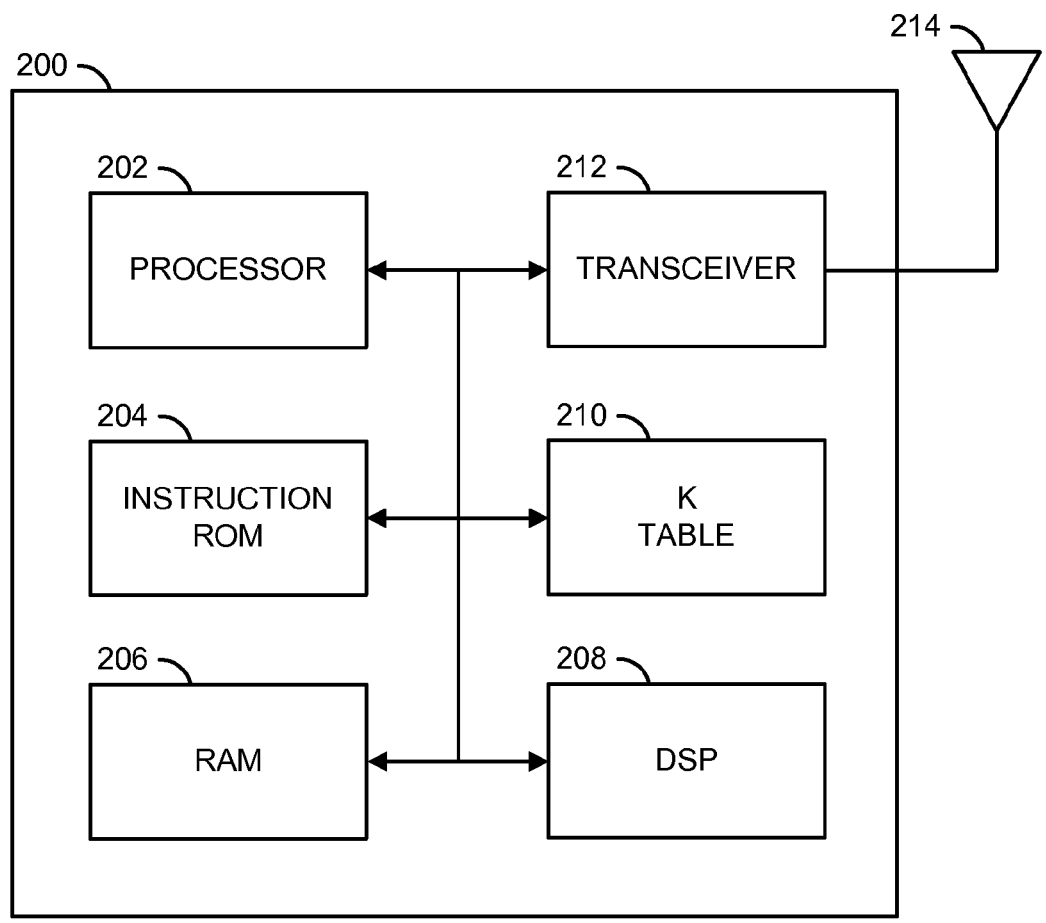
FIG. 3 is a diagram illustrating a processing unit in accordance with an example embodiment of the present invention.

Referring to FIG. 3, a block diagram is shown illustrating an example processing unit 200 that may be configured to implement pseudo-random sequence generation in accordance with a preferred embodiment of the present invention. In one example, the processing units 110 and 120 of FIG. 1 may be implemented using the processing unit 200. The processing unit 200 may include, but is not limited to, a block (or module) 202, a block (or module) 204, a block (or module) 206, a block (or module) 208, a block (or module) 210, a block (or module) 212, and a block (or module) 214. The block 202 may be implemented, in one example, as an embedded processor (e.g., ARM, etc.). The block 204 may be implemented as a read only memory (ROM). The block 206 may comprise random access memory (RAM). The block 208 may implement a digital signal processor (DSP). The block 210 may implement a lookup table (LUT) or memory embodying pre-calculated values for k(i,n) in accordance with an embodiment of the present invention. Although block 210 is shown as a separate module, it will be apparent to a person skilled in the relevant art that the block 210 may also be implemented as part (e.g., a partition, etc.) of one of the blocks 204 and 206. The block 212 may be implemented, in one example, as a transceiver. In another example, the block 212 may implement a transmitter and a receiver that are separate. The block 214 may implement an antenna (e.g., a cellular antenna, etc.). The block 212 may be configured to transmit and receive information via the antenna 214. The blocks 202-212 may be connected together using one or more busses. In one example, the block 204 may store computer executable instructions for controlling the processor 202 and/or the processor 208. Either or both of the processors 202 and 208 may incorporate hardware or execute software for generating pseudo-random sequences in accordance with an embodiment of the present invention.

Figure 4:
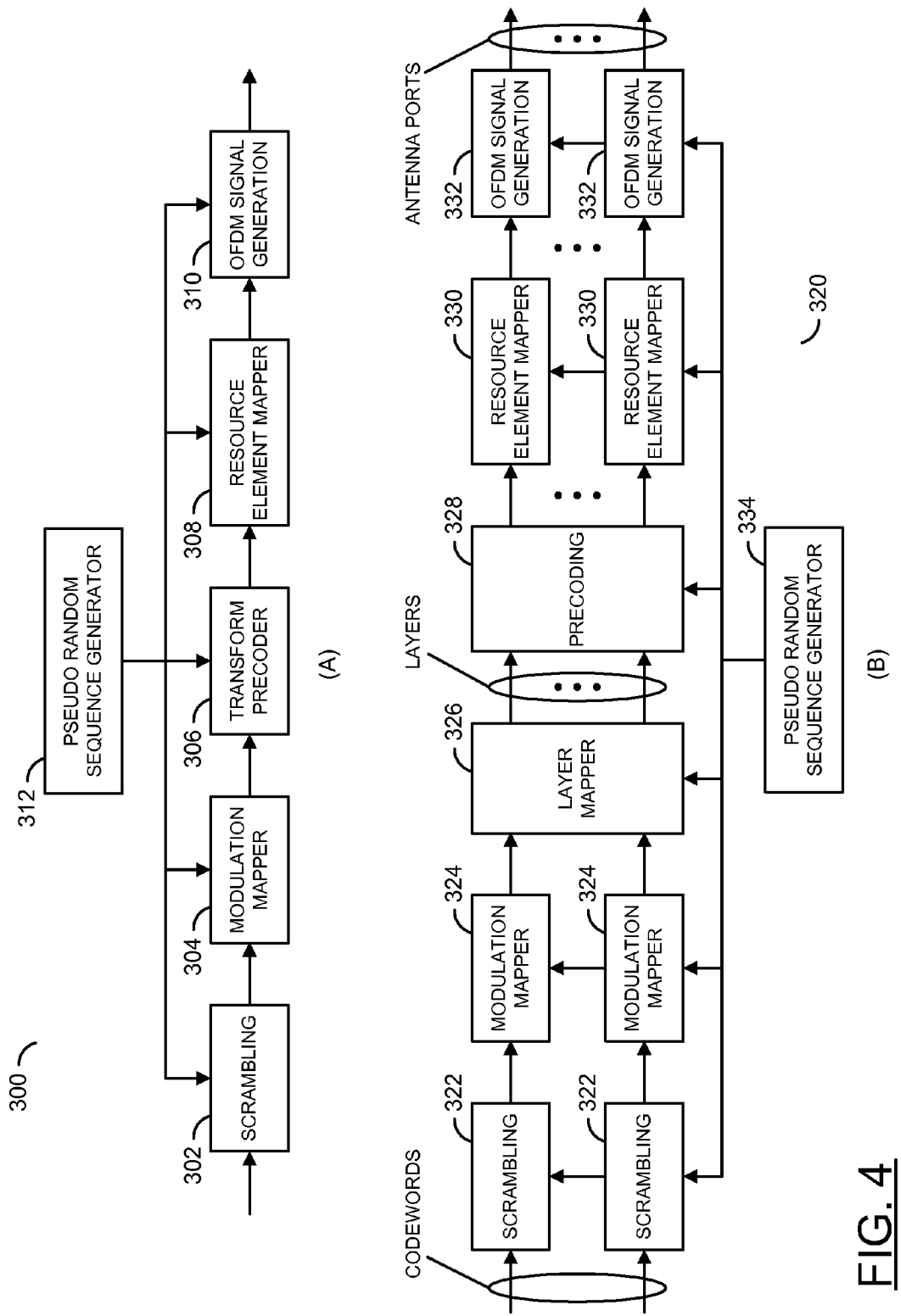
FIG. 4 is a diagram illustrating uplink and downlink physical channel processing flows incorporating pseudo-random sequence generation in accordance with an example embodiment of the present invention.

Referring to FIG. 4, diagrams are shown illustrating an uplink physical channel processing flow (A) and a downlink physical channel processing flow (B) incorporating pseudo-random sequence generation in accordance with an example embodiment of the present invention. In one example, the baseband signal representing the physical uplink shared channel may be defined in terms of a process 300. The process 300 may comprise a scrambling stage 302, a modulation mapper stage 304, a transform precoder stage 306, a resource element mapper stage 308, and a OFDM signal generation stage 310. The scrambling stage 302 may, in one example, scramble a block of bits to be transmitted on the physical uplink shared channel with a user equipment (UE) specific scrambling sequence prior to modulation. The modulation mapper stage 304 may provide modulation of the scrambled bits to generate complex-valued symbols. The transform precoder stage 306 may provide transform precoding to generate the complex-valued symbols. The resource element mapper stage 308 generally performs mapping of the complex-valued symbols to resource elements assign to the particular channel. The OFDM signal generation stage 310 may be configured to generate a complex-valued time-domain SC-FDMA signal for each antenna port of the system 100. Each of the stages 302-310 may utilize a pseudo-random sequence generated by a pseudo-random sequence generator 312 in accordance with an embodiment of the present invention. For example, when the stages 302-310 are compliant with the 3GPP LTE specification, a pseudo-random sequence generated by the pseudo-random sequence genera for 312 may be utilized at any point where section 7.2 is referenced.

In one example, the baseband signal representing a downlink physical channel may be defined in terms of a process 320. The process 320 may comprise scrambling stages 322, modulation mapper stages 324, a layer mapper stage 326, a precoding stage 328, resource element mapper stages 330, and OFDM signal generation stages 332. The scrambling stages 322 may be configured to scramble coded bits in each of a plurality of codewords to be transmitted on a physical channel prior to modulation. The modulation mapper stages 324 generally provide modulation of the scrambled bits to generate complex-valued modulation symbols. The layer mapper stage 326 generally provides mapping of the complex-valued modulation symbols onto one or several transmission layers. The precoding stage 328 generally provides precoding of the complex-valued modulation symbols on each layer for transmission on the antenna ports. The resource element mapper stages 330 generally provide mapping of the complex-valued modulation symbols for each antenna port to resource elements. The OFDM signal generations stages 332 generally provide generation of a complex-valued time-domain OFDM signal for each antenna port. Each of the stages 322-332 may utilize a pseudo-random sequence generated by a pseudo-random sequence generator 334 in accordance with an embodiment of the present invention. For example, when the stages 302-310 are compliant with the 3GPP LTE specification, a pseudo-random sequence generated by the pseudo-random sequence genera for 312 may be utilized at any point where section 7.2 is referenced.

Figure 5:
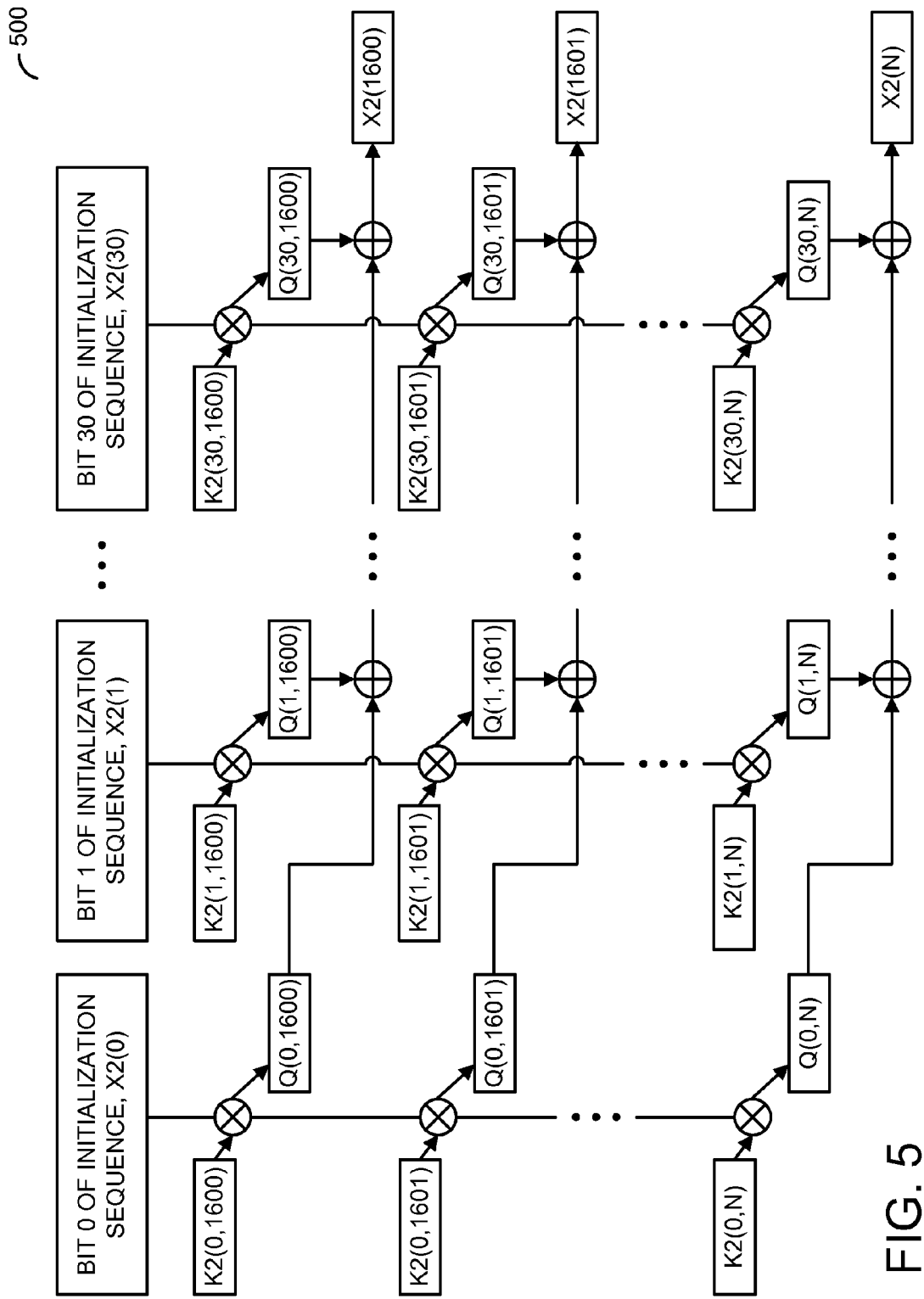
FIG. 5 is a flow diagram illustrating an example process in accordance with an example embodiment of the present invention.

Referring to FIG. 5, a flow diagram is shown illustrating a process 500 in accordance with an example embodiment of the present invention. The process (or method) 500 is generally configured to generate an advanced m-sequence (e.g., x2(1600 to N)) based on the initialization sequence x2(0 to 30) and the table of pre-calculated values k2(0 to 30, 1600 to N)). In a first step a number of products (e.g., Q(i,n)) may be generated by multiplying the initialization sequence x2(0 to 30) by corresponding K values (e.g., k2(i,n), i=0 to 30 and n=1600 to N). In a second step, the products Q(i,n) may be summed to generate each respective bit of the advanced sequence x2(n) (e.g., x2(n)=SUM(Q(i,n), i=0 to 30). In one example the process 500 may be performed serially to generate individual bits of the advanced sequence. In another example, the process 500 may be performed in parallel to generate a number of bits of the advanced sequence.

The values of the function k2(i,n) may be pre-calculated using the Equation 5 from above:

$$x2(n) = \left( \sum_{i=0}^{30} k2(i, n) x2(i) \right) \mod 2. \qquad \text{EQ. 5}$$

As described in the 3GPP specification, when the first 31 bits of the m-sequence x2 (e.g., x2(i), i=0, 1, ..., 30) are known, the m-sequence x2(n), where n is greater than or equal to 31 may be derived using Equation 3 from above.

$$x2(n+31)=(x2(n+3)+x2(n+2)+x2(n+1)+x2(n)) \mod 2. \qquad \text{EQ. 3}$$

For example, from Equation 3, for m-sequence bit x2(31), n=0. Using Equation 3 with n=0, $$x2(31)=(x2(3)+x2(2)+x2(1)+x2(0)) \mod 2. \qquad \text{EQ. 6}$$

Every bit x2(n), n=0 to N may be recursively described as a function of x2(0, 1, ..., 30). For example, for x2(59) n=28. Using Equation 3 with n=28, $$x2(59)=(x2(31)+x2(30)+x2(29)+x2(28)) \mod 2.$$

Applying Equation 6 to substitute for x2(31), $$\begin{aligned} x2(59) &= ((x2(3) + x2(2) + x2(1) + x2(0)) \mod 2 + \\ &\quad x2(30) + x2(29) + x2(28)) \mod 2 \\ &= (x2(3) + x2(2) + x2(1) + x2(0) + \\ &\quad x2(30) + x2(29) + x2(28)) \mod 2. \end{aligned} \qquad \text{Eq. 7}$$

Using Equation 7, k2(i,59) may be defined as follows:
k2(i,59)=1 for i={0, 1, 2, 3, 28, 29, 30};
k2(i,59)=0 for i={4-27}.

When a new initialization sequence (e.g., x2(0.30)) is specified, and x2(59) needs to be calculated, x2(31) does not need to be calculated and then used in x2(31)+x2(30)+x2(29)+x2(28). Instead, (x2(3)+x2(2)+x2(1)+x2(0)+x2(30)+x2(29)+x2(28)) mod 2 may be used to calculate x2(59) based on the offline calculation results of k2(59), which indicates the bits of the initialization sequence that participate in x2(59). A similar process may be used to pre-calculate the participating bits for advanced samples such as x2(1600).

The functions performed by the diagrams of FIGS. 4 and 5 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
    a first circuit configured to generate pseudo-random sequences in response to a first m-sequence and a second m-sequence, wherein said first m-sequence is initialized with a precalculated constant and said second m-sequence is initialized based on a pre-defined initial sequence and a table of pre-calculated values indicating which components of the initial sequence participate in initializing the second m-sequence; and
    a second circuit configured to store the table of pre-calculated values.

2. The apparatus according to claim 1, wherein said table of pre-calculated values describes a function $k2(i,n)$, where $i=0$ to 30 and $n=1600$ to 1630.

3. The apparatus according to claim 2, wherein said function is independent of said initial sequence.

4. The apparatus according to claim 1, wherein each value in said table of pre-calculated values is either a one or a zero.

5. The apparatus according to claim 1, wherein said apparatus is part of a wireless communication system.

6. The apparatus according to claim 1, wherein said apparatus is part of an evolved universal terrestrial radio access (E-UTRA) system.

7. The apparatus according to claim 1, wherein said apparatus is part of a 3GPP Long Term Evolution compliant system.

8. The apparatus according to claim 1, wherein said first circuit comprises:
    a multiplier circuit configured to generate an array of products based on said table of values and said initial sequence; and
    an adder circuit configured to generate components of an advanced sequence by summing respective products of said array of products.

9. The apparatus according to claim 1, wherein said second circuit is further configured to generate said table of pre-calculated values upon initiation or establishment of an uplink/downlink.

10. An apparatus comprising:
    means for generating pseudo-random sequences in response to a first m-sequence and a second m-sequence, wherein said first m-sequence is initialized with a pre-calculated constant and said second m-sequence is initialized based on a pre-defined initial sequence and a table of pre-calculated values indicating which components of the initial sequence participate in initializing the second m-sequence; and
    means for storing the table of pre-calculated values.

11. A method of calculating beginning values of a pseudo random sequence comprising the steps of:
    pre-calculating a plurality of values indicating which components of an initial sequence participate in initializing a second of two m-sequences used to generate said pseudo random sequence; and
    storing the pre-calculated values in a memory device.

12. The method according to claim 11, wherein the plurality of pre-calculated values defines a function $k2(i,n)$, where $i=0$ to 30 and $n=1600$ to 1630.

13. The method according to claim 11, further comprising calculating bits of an advanced sequence of the second m-sequence by summing bits of the initial sequence based on the pre-calculated values.

14. The method according to claim 13, wherein calculating the bits of the advanced sequence of the second m-sequence further comprises generating a product of each pre-calculated value and a respective bit of the initial sequence.

15. The method according to claim 13, further comprising:
    calculating bits of a number of advanced sequences of the second m-sequence by summing bits of a plurality of initial sequences based on the pre-calculated values;
    generating a pseudo-random sequence based upon a first m-sequence and one of the number of advanced sequences of the second m-sequence; and
    performing at least one operation in an evolved universal terrestrial radio access system based upon the pseudo-random sequence.

16. The method according to claim 15, wherein said evolved universal terrestrial radio access system comprises a long term evolution (LTE) cellular system.

17. The method according to claim 11, wherein the step of pre-calculating said plurality of values indicating which components of the initial sequence participate in initializing the second of two m-sequences used to generate said pseudo random sequence is performed upon initiation or establishment of an uplink/downlink channel.

18. The method according to claim 11, wherein each value comprises a single bit.

19. The method according to claim 11, wherein said memory device comprises a lookup memory.

20. The method according to claim 11, wherein said pseudo random sequence is generated by adding the two m-sequences.

\* \* \* \* \*